Jan. 27, 1959

F. S. BENHAM 2,870,533

JOINING TOGETHER OF METAL PARTS

Filed Jan. 10, 1955

INVENTOR
Frederick Samuel Benham,
BY Pierce, Scheffler & Parker
his ATTORNEYS

United States Patent Office 2,870,533
Patented Jan. 27, 1959

2,870,533

JOINING TOGETHER OF METAL PARTS

Frederick Samuel Benham, Twickenham, England, assignor to Vandervell Products Limited, London, England Application January 10, 1955, Serial No. 480,919

Claims priority, application Great Britain January 11, 1954

3 Claims. (Cl. 29—525)

This invention relates to the joining together of metal parts. It provides a method applicable generally to the securing together face to face of two metal parts, one at least of which is composed (at least in the portion to be joined) of sheet, plate, strip, or other material capable of being plastically deformed in a press.

In accordance with the invention at least one of the parts to be joined is subjected to a half-shearing operation to produce on the face to be joined a dowel or other projection, of any suitable shape, which is then inserted in a correspondingly shaped aperture in the joining face of the other part. (The use of the term half-shearing is not to be understood as implying that the height of the projection produced is necessarily exactly half the thickness of the material.) Any number of such projections and apertures may be employed and they may be distributed between the two parts in any desired way, but preferably each part is provided with equal numbers of projections and apertures disposed in a symmetrical manner, so that the same tool, or tool assembly, can be used to treat each part in turn.

The invention may be employed for simply securing two metal parts against angular rotation, or other relative movement, in the plane of the mating faces, but preferably the parts are locked together to prevent relative movement in any direction. Even in the case of articles intended to be locked together, a projection on one part may initially be a free fit in the cooperating aperture in the other part, but preferably a slight interference fit is used, so that the two parts have to be forced into engagement with one another.

Locking together of the parts is preferably effected by subjecting the apertured part to compression in a direction perpendicular to the mating faces of the parts, thereby causing the walls of the aperture to move inwardly into gripping engagement with the sides of the projection. The necessary compressive force may be applied in one operation with the force used to effect inter-engagement of the projection and aperture. However, if the aperture in one part extends completely through that part, the two parts may be locked together after assembly by expanding the projection outwardly against the wall of the aperture, as by striking it with a centre punch or similar tool.

The parts joined together may each be composed of a single metal and the two parts may then be of either the same metal (allowing the production of relatively thick parts from thin stock) or of two different metals. However, one or both the parts jointed together may be composed of two or more laminae of different metals. In particular, each of the parts may be composed of a layer of bearing metal bonded to one face of a layer of steel or other strong backing metal, the two parts being joined with their backing layers together to produce a composite article having a layer of bearing metal carried on the two opposite faces of a core of stronger metal. The two layers of bearing metal may have the same or different compositions, according to the purpose for which the article is required.

The accompanying drawing illustrates the application of the invention to the manufacture of double face bearing washers, but it will be understood that the invention is not limited to the production of such articles or to the particular materials and methods described. In the drawing.

Figure 1:
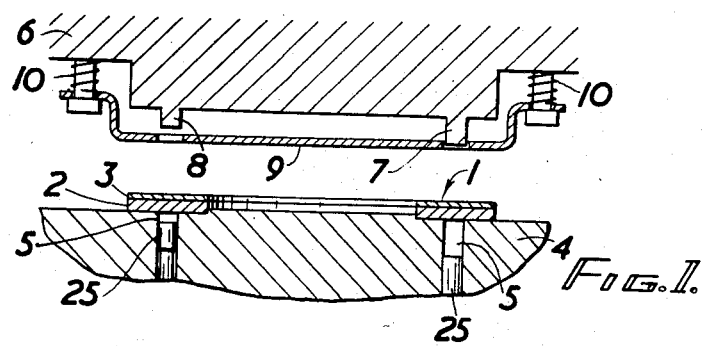
Figure 1 represents a vertical section through parts of a die press, with a blank in position.
Figure 2:
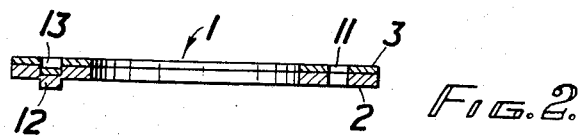
Figure 2 is a sectional view and Figure 3 a plan view of the blank after treatment in the press.

In carrying out the process illustrated by Figures 1 to 4, annular blanks such as 1 are cut from bimetallic material comprising a backing layer of steel 2 bonded to a layer of babbitt, lead bronze or other bearing metal 3. Alternatively use may be made of trimetallic material comprising a steel back, an intermediate layer and a final thin soft bearing metal layer. Each blank in turn is laid (bearing metal side uppermost) upon the face of a die 4 formed with a pair of cylindrical holes or recesses 5. Co-operating with this die is a punch 6 having a pair of cylindrical projections 7, 8 on its lower face. A stripper plate 9, apertured to pass over these projections, is carried below the lower face of the punch and is urged downwardly away from that face by spring means indicated at 10. When the punch is driven down towards the die the ends of the projections 7, 8 engage the blank and shear the metal of the blank into the apertures 5 in the die, the stripper plate 9 being driven back over the projections towards the lower face of the punch. One projection 7 is of sufficient length to shear a circular piece of metal completely out of the blank and produce a hole 11 (see Figures 2 and 3) therein. The length of the other projection 8 is such that it penetrates through only about one half the thickness of the blank, producing a cylindrical projection 12 on the lower (steel) face of the blank and a corresponding recess 13 on the upper face. Due to the shearing action, the sides of the projection and the walls of the recess are perpendicular to the face of the blank. When the punch again rises, it tends to lift the blank with it, but the stripper plate 9 is moved downwardly by its spring mounting means to free the blank from the punch.

Suitable knockout means 25 are slidably mounted in the die holes 5 for removing the blank projections therefrom, the left hand means serving also to engage the lower face of projection 12 as the latter is formed. Alternatively, it may be advantageous to blank the washer and form the holes and projections simultaneously in a suitable tool.

Figure 3:
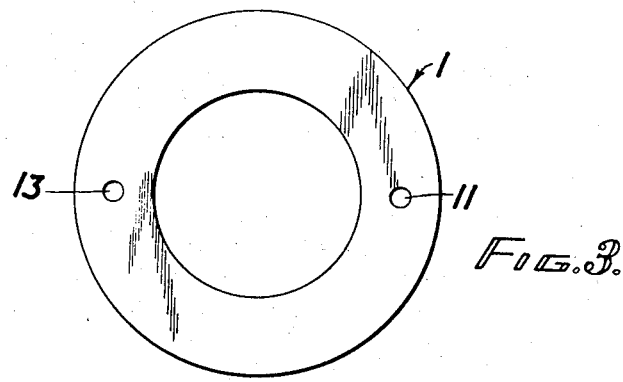
Figure 4:
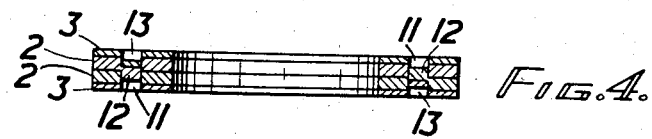
Figure 4 is a sectional view of a bearing washer made by securing together two blanks similar to that of Figures 2 and 3.

As shown in Figure 3, the hole 11 and the projection 12 formed in the blank 1 lies on the annular centre line of the blank and are disposed at opposite ends of the same diameter. The projection 12 has a diameter very slightly greater than that of the hole 11. Pairs of such blanks are assembled (steel to steel) with the projection 12 of each blank registered with the hole 11 in the other blank. Each pair of registered blanks is placed between a pair of flat press plates, which are then moved towards one another. The projections on the blanks are thereby first forced into the corresponding holes and the blanks are then compressed sufficiently to produce a plastic flow of the metal, the walls of the holes moving inwardly into gripping engagement with the side faces of the projections, thus firmly locking the two blanks together to form the double faced bearing washer shown in Figure 4.

When the two blanks are of the same, or nearly the same, thickness, as illustrated, the length of the projections on either blank will necessarily be less than the thickness of the other blank. However, when one blank is much thicker than the other blank its projection or projections may be long enough to pass completely through the other blank and the protruding end can then be rivetted over (preferably as part of the operation of effecting inter-engagement between the blanks) to assist in locking the parts together. If the face towards which the projection extends is to constitute a bearing surface, it will of course be necessary to ensure that the projection is below the bearing surface.

Figure 5:
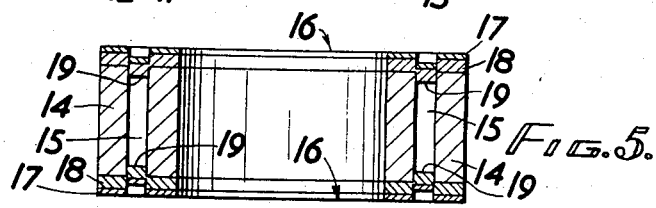
Figure 5 is a sectional view of another form of bearing element.

The invention has been thus far described with reference to the joining together of only two parts, but clearly it may be applied to the joining together of three or more parts, each pair of adjacent parts being interconnected in any of the ways described. By way of example of such a construction, a spacing sleeve having an annular bearing surface at each end could be produced as follows, the finished structure being shown in Figure 5. A hollow cylinder 14 of light alloy or steel or other suitable metal is formed on each annular end face with two or more bore holes 15 extending parallel to the axis. (If the cylinder is short, the same holes may, as shown, pass through from one face to the other.) Two annular discs 16, which may be stamped from bearing metal, or multilayer strip, but as shown are formed from bimetallic material comprising a layer of bearing metal 17 bonded to a steel or other backing layer 18, are subjected to a half shearing operation to produce on the backing metal face projections 19 corresponding in number, position, shape and size to the holes 15 in the end faces in the cylinder. The discs are applied to the two ends of the cylinders, with their projections registered with the holes, and the assembly is subjected to axial pressure to force the parts together and cause the metal of the cylinder to flow into locking engagement with the projections.

I claim:

1. The method of manufacturing a double-faced bearing washer consisting of two metal parts each having a relatively soft layer of bearing metal bonded to a relatively hard backing layer, comprising the steps of shearing at least one piece of metal partially out of each of said parts to form at least one projection on the backing layer surface of each of said parts, each of said projections having sides perpendicular to the backing faces of their corresponding parts and lengths less than the thicknesses of the other parts, shearing at least one aperture in the backing layer of each of said parts, said apertures having walls perpendicular to their corresponding backing faces, assembling the parts in face-to-face relationship with the backing layers contiguous and the bearing surfaces exposed to cause the projection of each part to be inserted into the corresponding aperture of the other part, and compressing the parts in a direction perpendicular to the mating faces of the parts whereby the walls of the apertures are compressed inwardly into gripping engagement with the sides of the projections.

2. The method of manufacturing a double-faced bearing washer as defined in claim 1 wherein the cross-sectional dimensions of said projections are slightly greater than the cross-sectional dimensions of said apertures and wherein slight compressive force is applied during the assembling step to force said projections into their respective apertures.

3. The method of securing two metal parts in face-to-face relation comprising the steps of shearing at least one piece of metal partially out of each of said parts to form at least one projection on the surface of each of said parts, each of said projections having sides perpendicular to the faces of their corresponding parts and lengths less than the thicknesses of the other parts, shearing at least one aperture in the faces of each of said parts spaced from the projection thereon, said apertures having walls perpendicular to their corresponding faces, assembling the parts in face-to-face relationship to cause the projection of each part to be inserted into the corresponding aperture of the other part, and compressing the parts in a direction perpendicular to the mating faces of the parts whereby the walls of the aperture are compressed inwardly into gripping engagement with the sides of the projections.

References Cited in the file of this patent

UNITED STATES PATENTS

| | | |
|---|---|---|
| Re. 19,309 | Archer et al. | Sept. 11, 1934 |
| 1,252,289 | Murray | Jan. 1, 1918 |
| 1,446,095 | Karaus | Feb. 20, 1923 |
| 1,489,479 | Brackett | Apr. 8, 1924 |
| 1,784,256 | Stout | Dec. 9, 1930 |
| 1,974,150 | Creveling | Sept. 18, 1934 |
| 2,663,072 | Pfistershammer | Dec. 22, 1953 |

FOREIGN PATENTS

| | | |
|---|---|---|
| 756,783 | Germany | June 8, 1953 |